(12) United States Patent
Nguyen et al.

(10) Patent No.: US 8,346,687 B2
(45) Date of Patent: Jan. 1, 2013

(54) SV REDUCTION METHOD FOR MULTI-CLASS SVM

(75) Inventors: Duc Dung Nguyen, Saitama (JP); Kazunori Matsumoto, Saitama (JP); Yasuhiro Takishima, Saitama (JP)

(73) Assignee: KDDI Corporation, Tokyo (JP)

( * ) Notice: Subject to any disclaimer, the term of this patent is extended or adjusted under 35 U.S.C. 154(b) by 662 days.

(21) Appl. No.: 12/560,921

(22) Filed: Sep. 16, 2009

(65) Prior Publication Data

US 2010/0070440 A1 Mar. 18, 2010

(51) Int. Cl.
*G06F 15/18* (2006.01)
(52) U.S. Cl. ........................................... 706/12
(58) Field of Classification Search .................. 706/12
See application file for complete search history.

(56) References Cited

OTHER PUBLICATIONS

An Efficient Method for Simplifying Support Vector Machines DucDung Nguyen DUNGDUC@JAIST.AC.JP TuBao Ho BAO@JAIST.AC.JP Japan Advanced Institute of Science and Technology, 1-1, Asahidai, Tatsunokuchi, Ishikawa 923-1292 Japan.*
Multiclass Reduced-Set Support Vector Machines Benyang Tang Benyang. TANG@JPL.NASA.GOV Dominic Mnzzoni DOMJNIC. MAZZONI@JPL.NASA.GOV Copyright 2006 by Benyang Ta.ng a.nd Dominic Mazzoni.*

Ducdung Nguyen, et al. "An Efficient Method for Simplifying Support Vector Machines," 2005, Japan Advanced Institute of Science and Technology.
Bernhard Scholkopf, et al. "Input Space Versus Feature Space in Kernel-Based Methods," IEEE Transactions on Neural Networks, Sep. 1999, vol. 10, No. 5.
Chris J.C. Burges, "Simplified Support Vector Decision Rules," 1996, Bell Laboratories.
Benyang Tang, et al. "Multiclass Reduced-Set Support Vector Machines," 2006, Jet Propulsion Laboratory.

* cited by examiner

*Primary Examiner* — Kakali Chaki
*Assistant Examiner* — Ababacar Seck
(74) *Attorney, Agent, or Firm* — Westerman, Hattori, Daniels & Adrian, LLP

(57) ABSTRACT

An SV reduction method for multi-class SVMs is provided with which a number of SVs contained in the multi-class SVMs can be reduced without becoming trapped in a local minimum optimization solution and the reduction of the SVs can be performed at high precision and high speed. The method includes a step of selecting, from a plurality of initially present support vectors, support vector pairs $z_i$, $z_j$ (i, j=1, 2, ..., $N_S$); a step of preparing a single-variable objective function with a single global maximum and determining a maximum value k of the objective function; and a step of applying the maximum value k to the support vector pairs $z_i$ and $z_j$ to determine a temporary vector Ztemp[i] of small classification errors; and the support vector pairs $z_i$, $z_j$ are represented by the temporary vector Ztemp[i].

9 Claims, 5 Drawing Sheets

(SIZE=5)

(SIZE=5)

(SIZE=4)

(SIZE=3)

SV REDUCTION METHOD FOR MULTI-CLASS SVM

The present application is claims priority of Japanese Patent Application Serial No. 2008-238950, filed Sep. 18, 2008, the content of which is hereby incorporated by reference in its entirety.

BACKGROUND OF THE INVENTION

1. Field of the Invention

The present invention relates to a support vector (SV) reduction method for multi-class support vector machine (hereinafter, "SVM"), and particularly relates to an SV reduction method for multi-class SVM by which a number of SVs can be reduced at high precision and high speed. In the following, "support vector" may at times be indicated as "SV."

2. Description of the Related Art

Although initially, support vector machines were designed for binary-class classification tasks, support vector machines designed for multi-class classification have also been developed in recent years. In a multi-class classification problem, more than one SVM are used to perform classification into multiple classes. In a multi-class SVM, a final decision function $f_t$ is calculated based on a function $f_t$ (where $t=1, 2, \ldots, T$) of time t that is from 1 to T:

[Formula 1]

$$f_t(x) = \sum_{i=1}^{N_S} \alpha_{ti} K(x_i, x) + b_t, t = 1, \ldots, T \quad (1)$$

In the above, $K(x, y)$ is a kernel function that calculates a dot product of two vectors x and y in some feature space. A time complexity of calculation of Formula (1) above increases with a number $x_i$ ($i=1, \ldots, N_S$) of SVs.

Reduced set methods for reducing the number of SVs are thus being studied. A main task is to construct a new set of vectors $z_i$ ($i=1, \ldots, N_Z$) that are reduced in number and coefficients $\beta_{ti}$ ($i=1, \ldots, N_z, t=1, \ldots, T$) corresponding thereto. The new functions $f'_t$ are as indicated in Formula (2) below.

[Formula 2]

$$f'_t(x) = \sum_{i=1}^{N_Z} \beta_{ti} K(z_i, x) + b_t, t = 1, \ldots, T \quad (2)$$

In the above, $N_Z \ll N_S$, and the new functions $f'_t(x)$ are thus calculated simpler and run faster when evaluating a new vector x.

As conventional methods for deriving Formula (2) from Formula (1), in other words, as conventional methods for reducing the number of SVs, the following methods (1) to (3) have been proposed.

(1) Top-Down Method for Two-Class SVM (Binary SVM) (Non-Patent Documents 1 and 2)

In a two-class SVM (an SVM for performing a process of classifying into two classes), each SV is associated with a single coefficient. In the method described in Non-Patent Documents 1 and 2, temporary vectors $z_i$ ($i=1, 2, \ldots, N_z$) are derived using Formulae (3) and (4) shown below. Once the temporary vectors $z_i$ are derived, the coefficients $\beta_i$ are determined.

[Formula 3]

$$(z_i, \beta_i) = \underset{z, \beta}{\operatorname{argmin}} \|\Psi_{i-1} - \beta \Phi(z)\| \quad (3)$$

In the above, $\psi_i$ is expressed by Formula (4) shown below:

[Formula 4]

$$\Psi_i = \sum_{k=1}^{N_S} \alpha_k \Phi(x_k) - \sum_{k=1}^{i} \beta_k \Phi(z_k), \Psi_0 = \sum_{k=1}^{N_S} \alpha_k \Phi(x_k) \quad (4)$$

The classification function $\Phi(z)$ of Formula (3) is a multivariable function of multiple variables $z (=z_1, z_2, \ldots, z_n)$ and thus a problem of a local minimum optimization solution occurs as be described below.

(2) Bottom-Up Method for Two-Class SVM (Non-Patent Document 3)

A method of reducing the number of SVs by a bottom-up method, that is, a method of iteratively selecting two SVs and replacing these by a newly constructed vector is proposed in Non-Patent Document 3.

(3) Top-Down Method for Multi-Class SVMs (Non-Patent Document 4)

A method of simplifying multi-class SVMs by extension of the reduced set construction method of Non-Patent Documents 1 and 2 is proposed in Non-Patent Document 4. In each iteration, a single, new, reduced $SV_z$ in a single SVM is generated and shared with the others by retraining all of the SVMs.

Non-Patent Document 1: Burges, C. J. C. 1996. Simplified support vector decision rules. International Conference on Machine Learning, 71-77.

Non-Patent Document 2: B. Scholkopf, S. Mika, C. J. C. Burges, P. Knirsch, K.-R. Muller, G. Ratsch, and A. Smola, "Input Space vs. Feature Space in Kernel-Based Methods," IEEE Trans. Neural Networks, vol. 10, pp. 1,000-1,017, September 1999.

Non-Patent Document 3: Nguyen D. D., Ho, T. B. 2005. An Efficient Method for Simplifying Support Vector Machines. International Conference on Machine Learning, ICML 2005, Bonn, Aug. 7-11, 2005, 617-624.

Non-Patent Document 4: Tang, B. and Mazzoni, D. 2006. Multi-class reduced-set support vector machines. International Conference on Machine Learning, Jun. 25-29, 2006. ICML'06, vol. 148. ACM, New York, N.Y., 921-928.

However, the conventional methods (1) to (3) described above have the following issues:

1. Top-Down Method for Two-Class SVM (Binary SVM) (Non-Patent Documents 1 and 2)

Main drawbacks of this method are that the SVM is poor in performance in that trapping in a local minimum optimization solution occurs readily and that the search for z in Formula (3) must be repeated many times to obtain a satisfactorily simplified SVM. A cause of becoming trapped in the local minimum optimization solution is that the classification function $\Phi(z)$ is a multivariable function.

2. Bottom-Up Method for Two-Class SVM (Non-Patent Document 3)

This method has the issues of being poor in precision due to trapping in a local minimum occurring readily and being applicable only to a two-class SVM with which each SV simply corresponds to only a single coefficient.

3. Top-Down Method for Multi-Class SVMs (Non-Patent Document 4)

In this method, the two-class SVM is extended and there is thus the issue of the SVMs being poor in precision due to trapping in a local minimum optimization solution occurring readily. To alleviate the problem of the local minimum optimization solution, a different evolution algorithm is used in combination with a gradient descent method in the process of constructing the reduced vectors. However, due to the nature of the problem, the classification result is unstable.

SUMMARY OF THE INVENTION

An object of the present invention is to provide an SV reduction method for multi-class SVMs, with which the number of SVs contained in the multi-class SVMs can be reduced without becoming trapped in a local minimum optimization solution. Another object is to provide an SV reduction method for multi-class SVMs, with which the number of SVs can be reduced at high precision and high speed.

In order to achieve the object, the invention is characterized by that an SV reduction method for multi-class SVMs comprises a first step of selecting, from a plurality of initially present support vectors, support vector pairs $z_i$, $z_j$ (i, j=1, 2, ..., $N_S$), a second step of preparing a single-variable objective function with a single global maximum and determining a maximum value k of the objective function, a third step of applying the maximum value k to the support vector pairs $z_i$, $z_j$ to determine a temporary vector Ztemp[i] with small classification errors, and a fourth step of representing the support vector pair $z_i$, $z_j$ by the temporary vector Ztemp[i].

Additionally, the invention is characterized by that the SV reduction method for multi-class SVMs further comprises a fifth step of selecting, from among the temporary vectors Ztemp[i], a temporary vector Ztemp[i] with the smallest classification error, a sixth step of selecting pairs from among the selected temporary vector Ztemp[i] and the remaining initial support vectors $z_i$ and $z_j$, a seventh step of applying the maximum value k to the selected support vector pairs and determining temporary vectors Ztemp[i] of small classification errors, and an eighth step of representing the support vector pairs by the temporary vectors Ztemp[i], and wherein the fifth to eighth steps are executed repeatedly and ending the support vector reduction process when a size of the support vector becomes equal to a reduction target size $N_Z$.

With the present invention, temporary vectors $Z_{temp}[i]$ of low classification error can be determined from pairs of SVs without becoming trapped in a local minimum optimization solution.

Thus in comparison to the conventional methods (1) to (3), the SV reduction process can be performed at high speed and multi-class SVMs that are highly efficient, stable, and high in processing speed can be provided.

DETAILED DESCRIPTION OF THE PREFERRED EMBODIMENT

Figure 1:
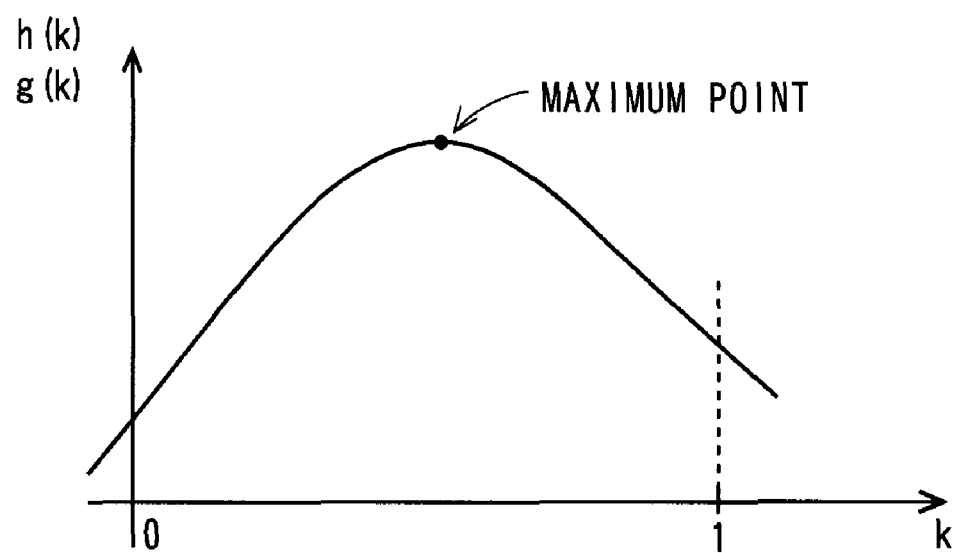
FIG. 1 is a graph showing that object functions h(k) and g(k) expressed by Formula (6) and Formula (8) are single variable functions (convex functions).

The present invention shall now be described in detail with reference to the drawings. First, principal portions of the present invention shall be described and thereafter, an embodiment according to the present invention shall be described.

By the present invention, SVs are reduced without becoming trapped in a local minimum optimization solution as in Non-Patent Documents 1, 2, 3, and 4. In a case where the kernel function K of Formula (1) and Formula (2) described above is a Gaussian kernel, that is, in the case where $K_{ij}=K(z_i, z_j)=\exp(-\gamma\|z_i-z_j\|^2)$, the SVs are reduced upon replacing $z_i$ and $z_j$, which are two SVs, by a newly constructed vector z (hereinafter referred to as the "temporary vector z") using Formula (5) and Formula (6) shown below. Coefficients $\beta_t$ of the temporary vector z are determined from Formula (9) shown below.

[Formula 5]

$$z=\kappa z_i+(1-\kappa)z_j \quad (5)$$

Here, k is expressed by Formula (6):

[Formula 6]

$$\kappa = \underset{k}{\operatorname{argmax}}\, h(k) = \sum_{t=1}^{T}\left(m_t K_{ij}^{(1-k)^2} + (1-m_t)K_{ij}^{k^2}\right) \quad (6)$$

$$m_t = \frac{\beta_{ti}}{\beta_{ti}+\beta_{tj}}$$

"arg" in Formula (6) is an abbreviation of "argument". h(k) in Formula (6) is an objective function optimized for a Gaussian kernel.

The objective function h(k) is an objective function derived from a condition of minimizing a classification error Err(z) (see Formula below) of the vector z, and detailed description thereof shall be omitted. Φ(z) is a classification function.

$$\text{Err}(z)=\|\Phi(z)-(m\Phi(z_i)+(1-m)\Phi(z_j))\|$$

In a case of a polynomial kernel, that is, in the case where $K_{ij}=K(z_i, z_j)=(z_i z_j)^p$, the SVs are reduced upon replacing $z_i$ and $z_j$, which are two SVs, by a newly constructed vector z using Formula (7) and Formula (8) shown below. Coefficients $\beta_t$ of the temporary vector z are determined from Formula (9) shown below.

[Formula 7]

$$z = \left(\frac{\sum_{t=1}^{T} \|M_t\|}{T}\right)^{1/p} \frac{z^*}{\|z^*\|} \quad (7)$$

Here, $z^* = \kappa z_i + (1 - \kappa) z_j$

[Formula 8]

$$\left.\begin{array}{l} \kappa = \underset{k}{\operatorname{argmax}} g(k) = \sum_{t=1}^{T} \|M_t\| u(k) v_t(k) \\ M_t = \beta_{ti} \Phi(z_i) + \beta_{tj} \Phi(z_j) \\ u(k) = \dfrac{1}{[z_i^2 k^2 + 2z_i z_j k(1-k) + z_j^2 (1-k)^2]^{p/2}} \\ v_t(k) = \dfrac{\beta_{ti}[z_i^2 k + z_i z_j(1-k)]^p + \beta_{tj}[z_i z_j k + z_j^2(1-k)]^p}{(\beta_{ti} + \beta_{tj})} \end{array}\right\} \quad (8)$$

g(k) in Formula (8) is an objective function optimized for the polynomial kernel. As with the objective function h(k), the objective function g(k) is an objective function derived from a condition of minimizing the classification error Err(z) of the vector z.

[Formula 9]

$$\beta_t = \frac{\beta_{ti} K(z, z_i) + \beta_{tj} K(z, z_j)}{K(z, z)}, \quad t = 1, \ldots, T \quad (9)$$

As shown in FIG. 1, each of the objective function h(k) in Formula (6) and the objective function g(k) in Formula 8 is a single-variable function (convex function) having a single global maximum in the interval [0, 1], and the global maximums of these functions can thus be found easily. Once the global maximum of the objective function h(k) or g(k) is found, the temporary vector z can be determined easily by Formula (5) or Formula (7).

As mentioned above, each of the objective functions h(k) and g(k) is a single-variable function (convex function) having a single global maximum in the interval [0, 1], and a single, new support vector z (that is, the temporary vector z) can thus be determined from two support vectors $z_i$ and $z_j$ without ending up with the local minimum optimization solution problem by solving Formula (5) under the restriction of Formula (6) in a case of a Gaussian kernel and by solving Formula (7) under the restriction of Formula (8) in a case of a polynomial kernel.

As is clear from the above, a main point of the present invention is that Formula (5) is solved under the restriction of the objective function h (k) as expressed by Formula (6) or Formula (7) is solved under the restriction of the objective function g(k) as expressed by Formula (8).

An algorithm of an embodiment of an SV reduction method for multi-class SVMs according to the present invention shall now be described with reference to the flowcharts of FIGS. 2, 3, and 4 and the explanatory diagram of FIG. 5. Although with the present embodiment, a case of a Gaussian kernel shall be described, the present invention can be embodied in likewise manner in a case of a polynomial kernel.

Figure 2:
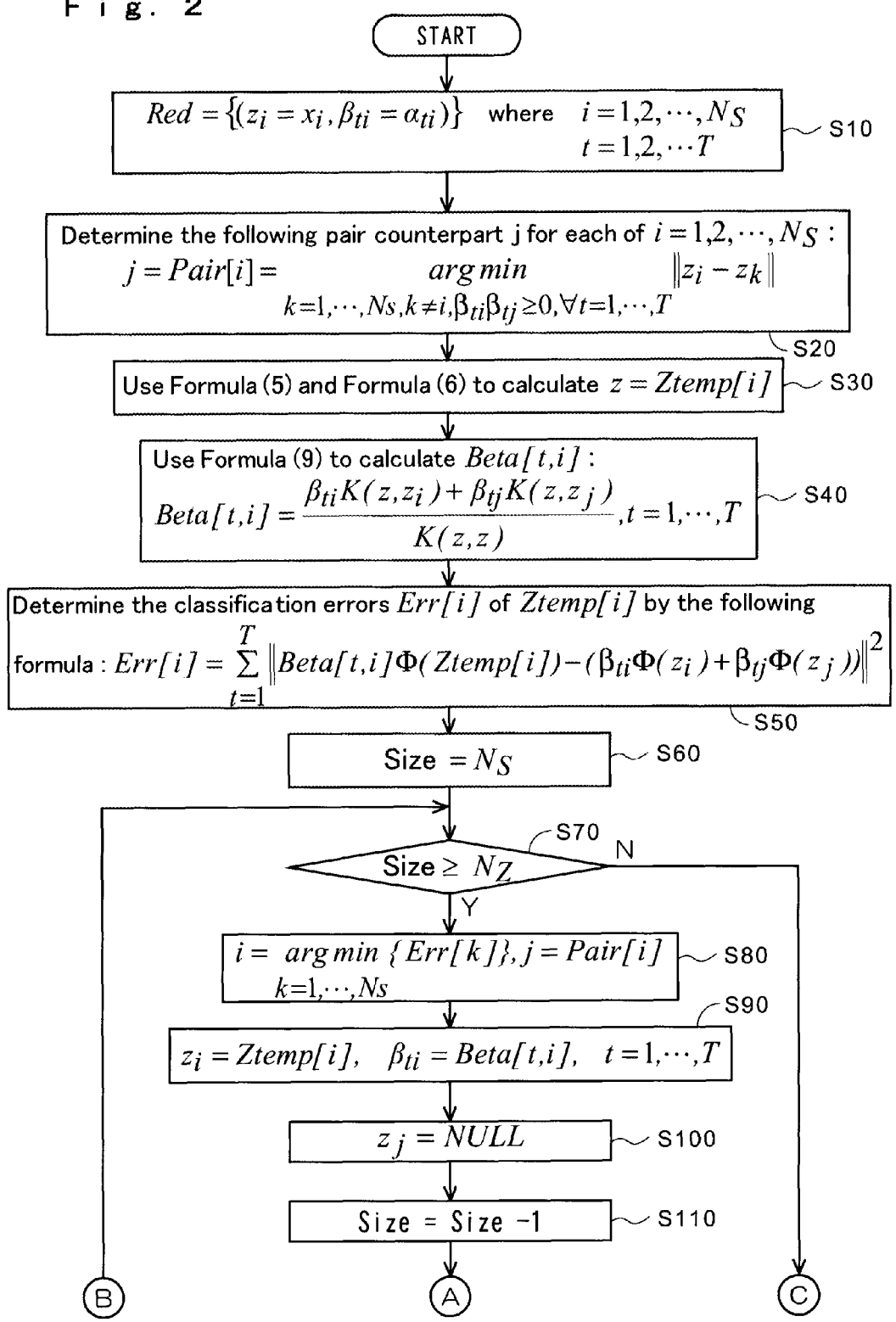
FIG. 2 is a flowchart showing a processing procedure according to an embodiment of the present invention.
Figure 5A:
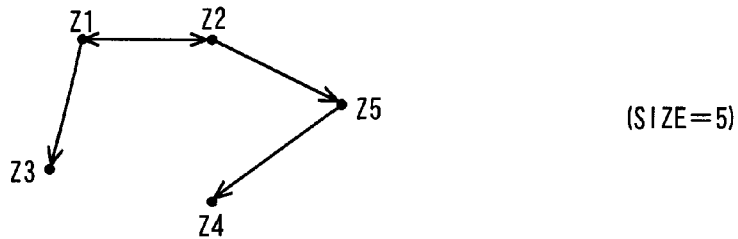
FIG. 5 shows schematic explanatory diagrams of the processes of FIGS. 2 and 3.

In step S10 of FIG. 2, all initial support vectors $x_i$ and coefficients $\alpha_{ti}$ thereof are respectively set as $z_i$ and $\beta_{ti}$ (i=1, 2, ..., $N_S$; t=1, 2, ..., T) and this set of vectors is deemed to be the support vectors (Red) to be reduced. For example, the support vectors z1, z2, ..., z5 of FIG. 5A are deemed to be the support vectors (Red) to be reduced.

In step S20, for each $z_i$, a pair (counterpart), j=Pair[i], of shortest distance is selected from among the support vectors $z_k$ (k≠i, k=1, 2, ..., $N_S$). For example, the pairs z1-z2, z3-z1, z4-z5, and z5-z2 in FIG. 5A are determined.

Next, in step S30, the temporary vectors z=Ztemp[i] are calculated using Formula (5) and Formula (6). Each z is an SV resulting from internally dividing a pair so as to minimize the classification error Err within the pair and, for example, the each z corresponds to Ztemp[1], Ztemp[3], Ztemp[4], and Ztemp[5] shown in FIG. 5B. In the case of the polynomial kernel, the temporary vectors Ztemp[i] are calculated using Formula (7) and Formula (8).

In step S40, the coefficients Beta[t, i] of the respective SVs are calculated using Formula (9).

Figure 5B:
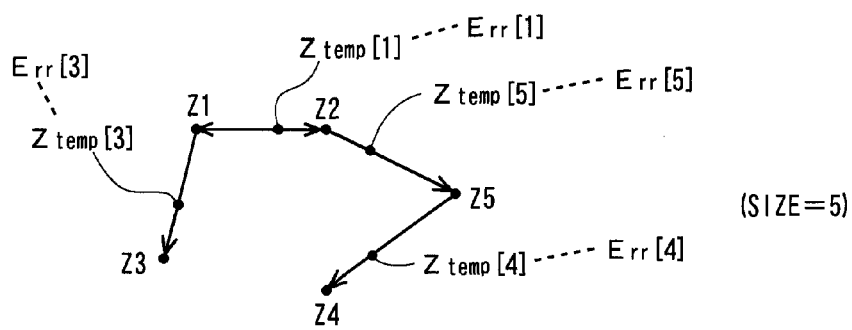

In step S50, the classification errors Err[i] of Ztemp[i] are determined. In the formula, Φ is the classification function. For example, Err[1] of Ztemp[1], Err[3] of Ztemp[3], etc. shown in FIG. 5B are determined.

The processes of a first stage of determining the temporary vectors Ztemp[i], the coefficients Beta[t, i], and the classification errors Err[i] of Ztemp[i] for the support vectors (Red) to be reduced are ended with the above.

Next, in step S60, a size is set as: size=$N_S$. Here, the size $N_S$ is the initial size of the SVs. For example, in the present example, the initial size of the SVs is equal to 5 as shown in FIGS. 5A and 5B.

In step S70, it is determined whether or not a condition, size≧$N_Z$, holds. Here, the size $N_Z$ is a target size for SV reduction, with $N_Z$<<$N_S$. For example, $N_Z$=(1/10)$N_S$.

In step S80, the argument of a minimum member in the set of Err[k] is set as i. The argument of the pair counterpart with the minimum member of argument i is set as j. In step S90, Ztemp[i], with the minimum error, is set as the support vector $z_i$ and the coefficients $\beta_{ti}$ of this $z_i$ are determined.

In step S100, the counterpart of the pair is null, that is, deleted. Thus in step S110, the size of the SVs is reduced by just one and becomes: (size-1).

Figure 5C:
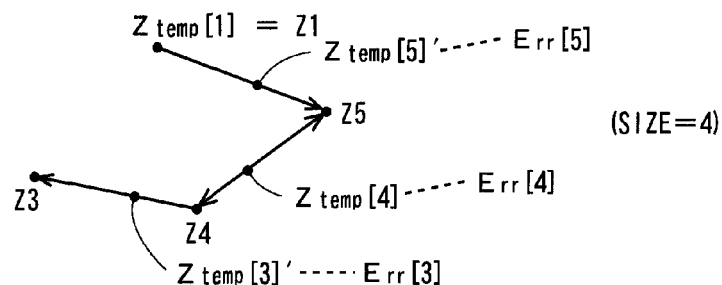

For example, if Err[1] is the minimum error in FIG. 5B, Ztemp[1] is set equal to z1 as shown in FIG. 5C, and z2 is null. The size of the SVs is reduced by one from the initial size=5 so that size=4.

Figure 3:
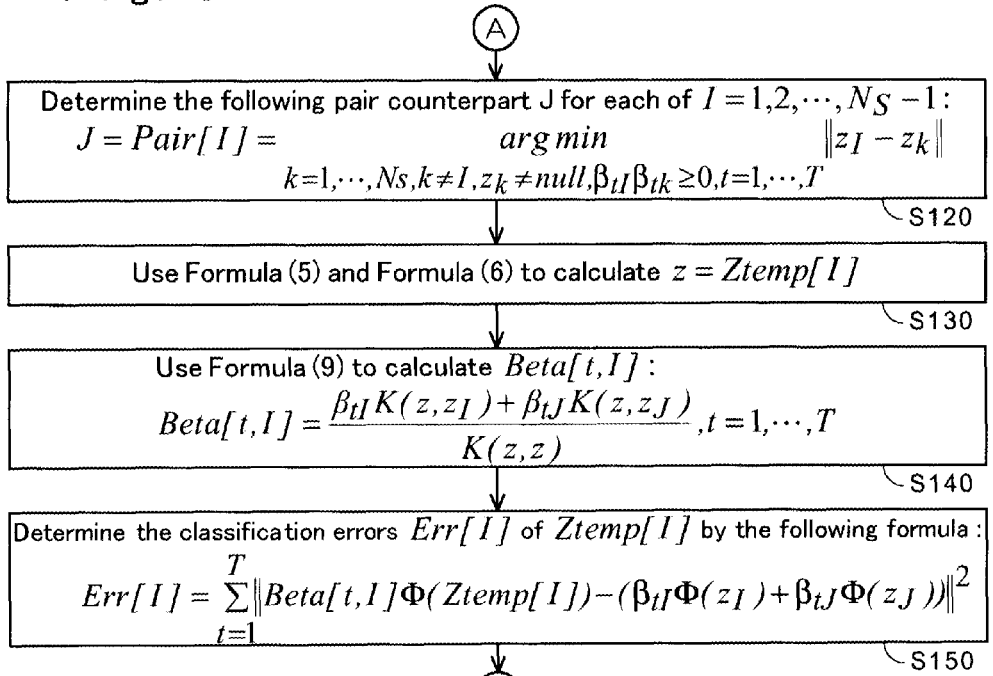
FIG. 3 is a flowchart showing the procedure continuing from FIG. 2.

Next, step S120 of FIG. 3 is entered. In step S120, for a certain entry I (=1, 2, ..., $N_S$–1) related to the size, a pair (counterpart) j=Pair[I], corresponding to the shortest distance, is determined in the same manner as in step S20. The entry I is clearly reduced from $N_S$ by the number reduced in step S110. As shown for example in FIG. 5C, the pairs (Ztemp[1]=) z1-z5, z3-z4, and z4-z5 are determined in step S120. These pairs differ from the pairs of FIG. 5A because the initial support vectors z1 and z2 have been deleted and replaced by the temporary vector Ztemp[I] (=z1).

In step S130, z=Ztemp[I] are calculated using Formula (5) and Formula (6) in the same manner as in step S30. For example, Ztemp[3]' and Ztemp[5]' are determined anew as shown in FIG. 5C.

In step S140, the coefficients Beta [t, I] of the respective SVs are calculated using Formula (9) in the same manner as in step S40.

In step S150, the classification errors Err[I] of Ztemp[I] are determined in the same manner as in step S50. For example, Err[3] of Ztemp[3]', Err[5] of Ztemp[5'], etc. are determined as shown in FIG. 5C.

When the processes of a second stage of determining the temporary vectors Ztemp[I], the coefficients Beta[t, I], and the classification errors Err[I] of Ztemp[I] for the case where the size of the SVs has been reduced by one are thus ended, a return to step S70 of FIG. 2 is performed.

If in step S70, the size of the SVs is determined to be still greater than the reduction target size $N_Z$, step S80 is entered again, and the pair counterpart j, corresponding to the smallest classification error among the classification errors Err[I] of Ztemp[I], which were determined in step S150, is selected. For example, if Ztemp[4] in FIG. 5C is the smallest classification error, the pair z4-z5 corresponding to the classification error Err[4] is selected.

Figure 5D:
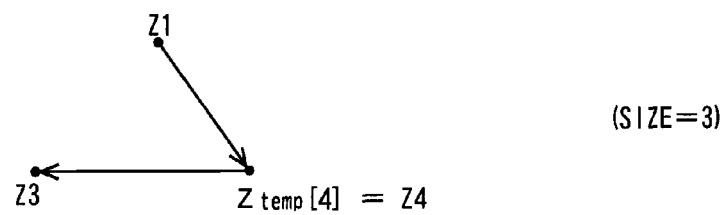

In step S90, Ztemp[i] is set as the support vector $z_i$ and the coefficients $\beta_{ti}$ of this $z_i$ are determined. For example, as shown in FIG. 5D, Ztemp[4]=z4 and the coefficients $\beta_{t4}$ of z4 are determined.

In step S100, the pair counterpart z5 is null, that is, z5=NULL, and the size is reduced by one in step S110. As a result, the size of the SVs becomes equal to 3 as shown in FIG. 5D.

Step S120 of FIG. 3 is then entered and the processes of steps S120 to S150 are performed on I=1, 2, . . . , $N_{S-2}$.

Figure 4:
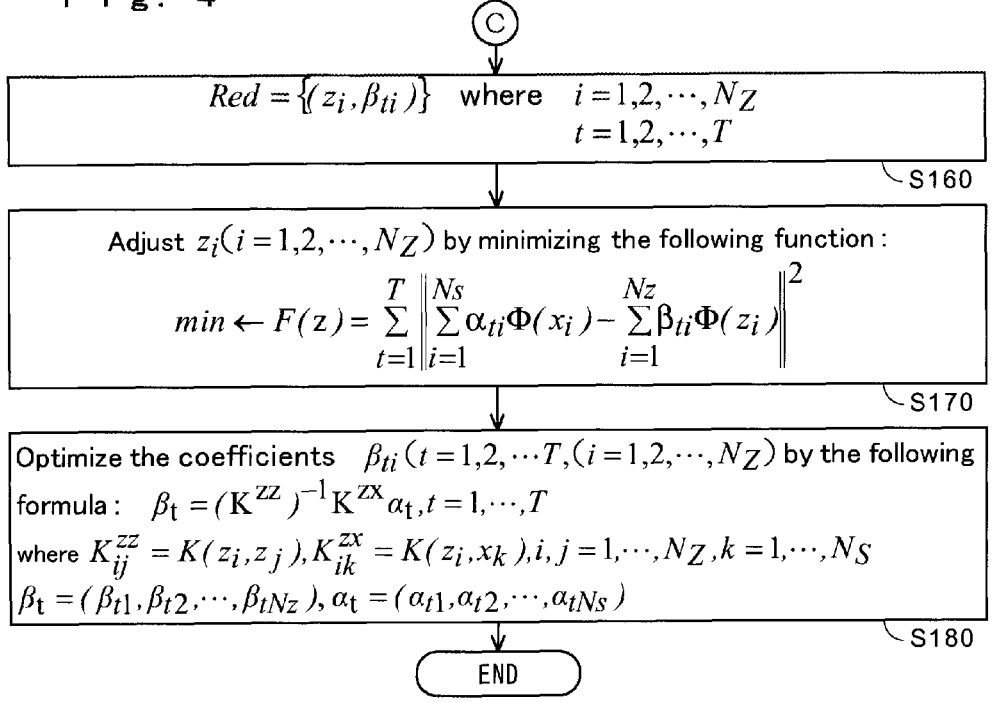
FIG. 4 is a flowchart showing the procedure continuing from FIG. 2.

The processes of steps S70 to S150 are thus performed repeatedly, the size is reduced by one in each single cycle, and when the determination of step S70 is negative, that is when the size of the SVs reaches the reduction target size $N_Z$, the process enters step S160 of FIG. 4.

The processes of steps S160 to 180 are processes of correcting the support vectors $z_i$ that have been reduced as described above and the coefficients $\beta_{ti}$ thereof.

In step S160, a set ($z_i$, $\beta_{ti}$) with the reduced size is set as the reduced support vectors (Red).

In step S170, a computation of minimizing a function F(z) while keeping the coefficients $\beta_{ti}$ fixed is performed. The function F(z) is a known optimization function. As the coefficients $\beta_{ti}$ in the function F(z), the values determined in S140 are used.

In step S180, a process of optimizing the coefficients $\beta_{ti}$ while keeping the determined vectors $z_i$ in S170 fixed is performed. Whereas the above computation processes took time for computation conventionally because computations of determining optimal solutions that minimize the function F(z) were performed using the vectors $z_i$ and coefficients $\beta_{ti}$ of the F(z) as variables, in the present invention, the computation speed can be made significantly high in comparison to the conventional case because the computation of minimizing the function F(z) while keeping the coefficients $\beta_{ti}$ fixed is performed in step S170 and the computation of optimizing the coefficients $\beta_t$ while keeping the vectors $z_t$ fixed is performed in step S180.

Figure 6:
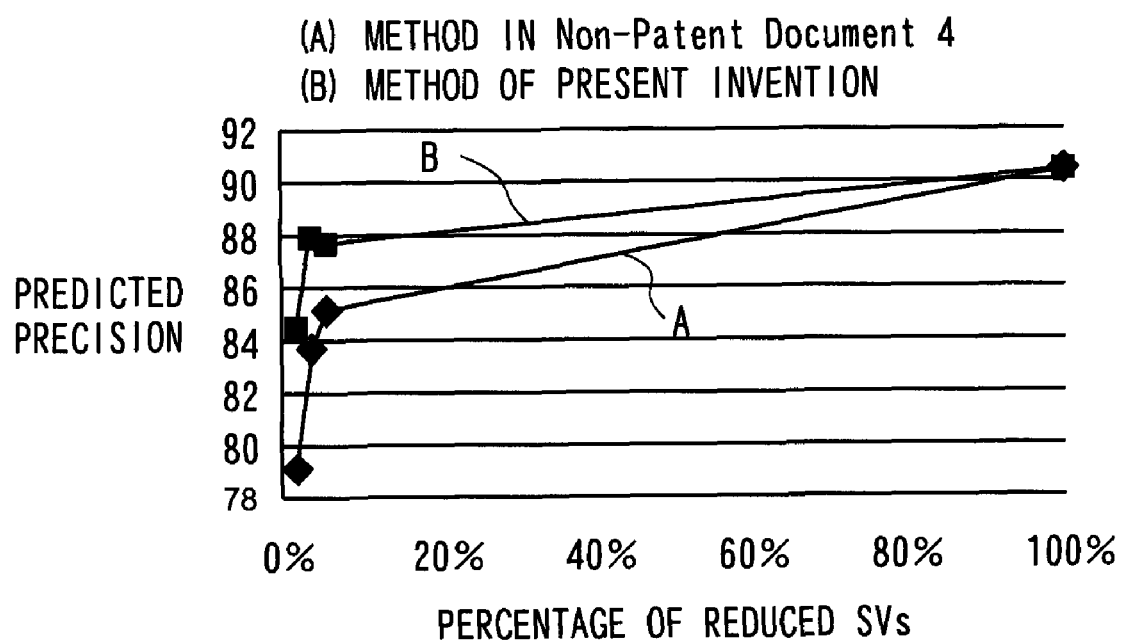
FIG. 6 is a graph showing a comparison of the present invention and a conventional art.

FIG. 6 is a graph in which predicted precisions of SVMs in a case of reducing SVs by the method of the present invention (B) and a case of reducing the SVs by the method described in Non-Patent Document 4 (A) are compared, with an ordinate axis indicating the predicted precision and an abscissa axis indicating a percentage of the reduced SVs. The curve A was not determined theoretically but was determined by a specific experiment.

As is clear from FIG. 6, the curve (B) is positioned above the curve (A), and it can thus be understood that the reduction of SVs by the present invention is better in predicted precision than the reduction of SVs by the method of Non-Patent Document 4. Moreover as described above, by the present invention, the reduction of SVs can be performed at a higher speed in comparison to the conventional art.

Although the present invention has been described above by way of an embodiment, the present invention is not restricted to the embodiment and clearly, various modifications are possible within a range not falling outside the scope of the present invention.

What is claimed is:

1. An SV reduction method for multi-class SVMs comprising:
    a first step of selecting, from a plurality of initially present support vectors, support vector pairs $z_i$, $z_j$ (i, j=1, 2, . . . , $N_s$) which are the shortest distance between them;
    a second step of preparing a single-variable objective function with a single global maximum and determining a maximum value k of the objective function;
    a third step of applying the maximum value k to the support vector pairs $z_i$, $z_j$ to determine a temporary vector Ztemp [i] with small classification errors; and
    a fourth step of representing the support vector pair $z_i$, $z_j$ by the temporary vector Ztemp[i], wherein
    in a case where the objective function is optimized for a Gaussian kernel,
    a process of determining the maximum value k of a function h(k) of the following Formula (6) is performed in the second step, and
    the temporary vector Ztemp[i] is determined using the following Formula (5a) in the third step:

[Formula 6]
$$\kappa = \underset{k}{\mathrm{argmax}}\, h(k) = \sum_{t=1}^{T} \left( m_t K_{ij}^{(1-k)^2} + (1-m_t) K_{ij}^{k^2} \right) \qquad (6)$$
$$m_t = \frac{\beta_{ti}}{\beta_{ti} + \beta_{tj}}$$

[Formula 5a]
$$Ztemp[i] = \kappa z_i + (1-\kappa) z_j \qquad (5a)$$

wherein
    h(k) is an objective function optimized for the Gaussian kernel,
    mt is a ratio of coefficient βti of support vector,
    βti and βtj are coefficients of support vector,
    Kij is a kernel function,
    T is the largest value of time t, and
    Ns is the largest value of suffix i and j.

2. The SV reduction method for multi-class SVMs according to claim 1, wherein
    the temporary vector Ztemp[i] is determined internally dividing the two support vectors $z_i$ and $z_j$ by the maximum value k.

3. The SV reduction method for multi-class SVMs according to claim 1, wherein
    a coefficient $\beta_t$ of the temporary vector Ztemp[i] is calculated using the following Formula (9):

[Formula 9]
$$\beta_t = \frac{\beta_{ti} K(z, z_i) + \beta_{tj} K(z, z_j)}{K(z, z)}, \quad t = 1, \ldots, T \qquad (9)$$

wherein
    K is a kernel function,
    βti and βtj are coefficients of support vector,
    T is the largest value of time t, and
    t is time.

4. The SV reduction method for multi-class SVMs according to claim 1, further comprising:
 a fifth step of selecting, from among the temporary vectors Ztemp[i], a temporary vector Ztemp[i] with the smallest classification error;
 a sixth step of selecting pairs from among the selected temporary vector Ztemp[i] and the remaining initial support vectors $z_i$, and $z_j$;
 a seventh step of applying the maximum value k to the selected support vector pairs and determining temporary vectors Ztemp[i] of small classification errors; and
 an eighth step of representing the support vector pairs by the temporary vectors Ztemp[i]; and wherein
 the fifth to eighth steps are executed repeatedly and ending the support vector reduction process when a size of the support vector becomes equal to a reduction target size $N_z$.

5. The SV reduction method for multi-class SVMs according to claim 4, further comprising:
 a ninth step of subjecting the reduction-processed support vectors and the coefficients corresponding thereto to a minimization of the classification error functions with the coefficients being fixed and an optimization the coefficients with the classification error functions being fixed.

6. An SV reduction method for multi-class SVMs comprising:
 a first step of selecting, from a plurality of initially present support vectors, support vector pairs $z_i, z_j$ (i, j=1, 2, . . . , $N_s$) which are the shortest distance between them;
 a second step of preparing a single-variable objective function with a single global maximum and determining a maximum value k of the objective function;
 a third step of applying the maximum value k to the support vector pairs $z_i, z_j$ to determine a temporary vector Ztemp[i] with small classification errors; and
 a fourth step of representing the support vector pair $z_i, z_j$ by the temporary vector Ztemp[i], wherein
 in a case where the objective function is optimized for a polynomial kernel,
 a process of determining the maximum value k of a function g(k) of the following Formula (8) is performed in the second step, and the temporary vector Ztemp[i] is determined using the following Formula (7a) in the third step:

[Formula 8]

$$\kappa = \underset{k}{\mathrm{argmax}}\, g(k) = \sum_{t=1}^{T} \|M_t\| u(k) v_t(k) \qquad (8)$$
$$M_t = \beta_{ti}\Phi(z_i) + \beta_{tj}\Phi(z_j)$$
$$u(k) = \frac{1}{[z_i^2 k^2 + 2 z_i z_j k(1-k) + z_j^2 (1-k)^2]^{p/2}}$$
$$v_t(k) = \frac{\beta_{ti}[z_i^2 k + z_i z_j(1-k)]^p + \beta_{tj}[z_i z_j k + z_j^2(1-k)]^p}{(\beta_{ti} + \beta_{tj})}$$

[Formula 7a]

$$Ztemp[i] = \left(\frac{\sum_{t=1}^{T} \|M_t\|}{T}\right)^{1/p} \frac{z^*}{\|z^*\|} \qquad (7a)$$

Here,
$$z^* = \kappa z_i + (1-\kappa) z_j$$

wherein
 g is an objective function optimized for the polynomial kernel,
 βti and βtj are coefficients of vector,
 zi and zj are support vectors that are reduced in number,
 p is a positive number,
 Φ is a classification function,
 k is a maximum value of g(k),
 z* is a temporary vector, and
 Ns is the largest value of suffix i and j.

7. The SV reduction method for multi-class SVMs according to claim 6, wherein
 a coefficient $\beta_t$, of the temporary vector Ztemp[i] is calculated using the following Formula (9):

[Formula 9]

$$\beta_t = \frac{\beta_{ti} K(z, z_i) + \beta_{tj} K(z, z_j)}{K(z, z)}, \quad t = 1, \ldots, T \qquad (9)$$

wherein
 K is a kernel function,
 βti and βtj are coefficients of support vector,
 T is the largest value of time t, and βt is time.

8. The SV reduction method for multi-class SVMs according to claim 6, further comprising:
 a fifth step of selecting, from among the temporary vectors Ztemp[i], a temporary vector Ztemp[i] with the smallest classification error;
 a sixth step of selecting pairs from among the selected temporary vector Ztemp[i] and the remaining initial support vectors $z_i$, and $z_j$;
 a seventh step of applying the maximum value k to the selected support vector pairs and determining temporary vectors Ztemp[i] of small classification errors; and
 an eighth step of representing the support vector pairs by the temporary vectors Ztemp[i]; and wherein
 the fifth to eighth steps are executed repeatedly and ending the support vector reduction process when a size of the support vector becomes equal to a reduction target size $N_z$.

9. The SV reduction method for multi-class SVMs according to claim 8, further comprising:
 a ninth step of subjecting the reduction-processed support vectors and the coefficients corresponding thereto to a minimization of the classification error functions with the coefficients being fixed and an optimization the coefficients with the classification error functions being fixed.

* * * * *